United States Patent

[11] 3,540,411

| [72] | Inventors | Harold Taylor<br>Westfield and<br>Ernest Gamble, Ridgewood, New Jersey |
|---|---|---|
| [21] | Appl. No. | 694,004 |
| [22] | Filed | Dec. 27, 1967 |
| [45] | Patented | Nov. 17, 1970 |
| [73] | Assignee | Kentile Floors Inc.<br>Brooklyn, New York<br>a corporation of New York |

[54] APPARATUS FOR THE FABRICATION OF DECORATIVE PROTECTIVE COVERINGS
4 Claims, 6 Drawing Figs.

| [52] | U.S. Cl. | 118/311 |
|---|---|---|
| [51] | Int. Cl. | B05c 5/00 |
| [50] | Field of Search | 118/308, 24, 310, 311, 7, 312, (Anti-offset Dig): 156/552, 302, 303; 221/175; 198/30 |

[56] References Cited
UNITED STATES PATENTS

| 1,627,577 | 5/1927 | Salerno | 118/24X |
| 2,347,164 | 4/1944 | Petrilli | 118/24X |
| 2,962,081 | 11/1960 | Dobry et al. | 118/310X |
| 2,962,381 | 11/1960 | Dobry et al. | 118/308X |
| 3,283,740 | 11/1966 | Fredricksen | 118/308X |
| 3,376,849 | 4/1968 | Squier | 118/308X |
| 3,446,184 | 5/1969 | Johnson | 118/7X |

*Primary Examiner*—John P. McIntosh
*Attorney*—Robert G. Mc Morrow

ABSTRACT: Apparatus for the fabrication of embedded chip protective covering, the apparatus having a feed hopper for supplying the chips and having a distribution mechanism for preorienting the chips in a pattern prior to deposit on a movable forming web.

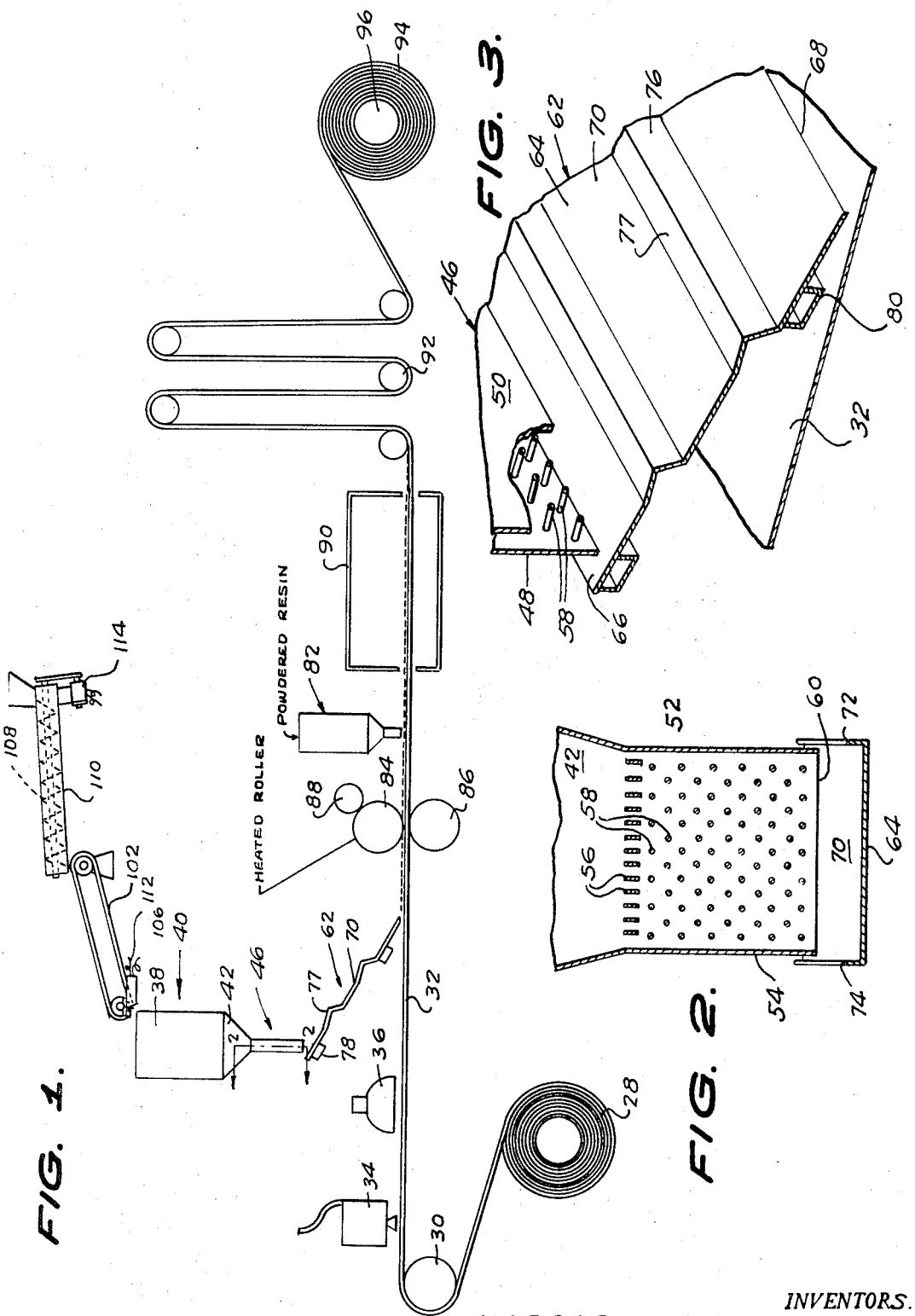

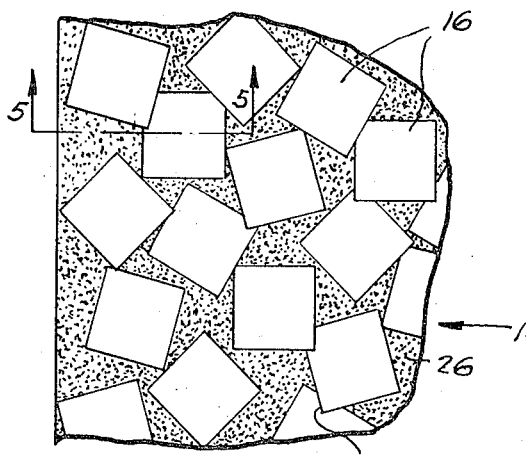
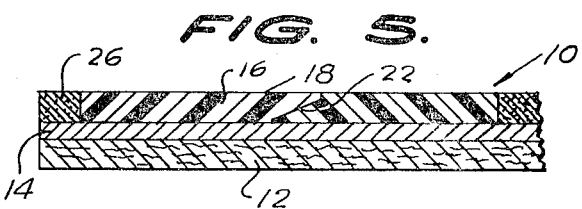
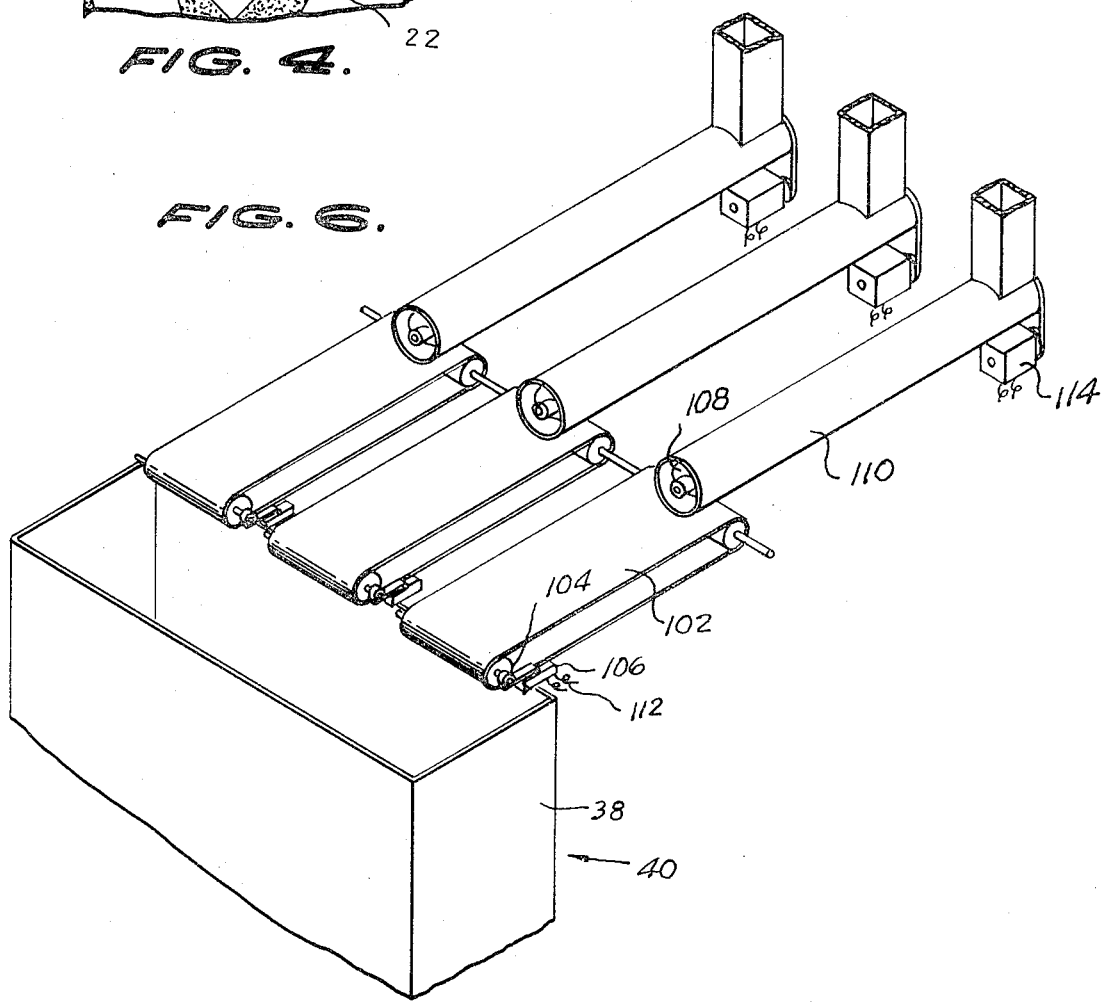
INVENTORS.
HAROLD TAYLOR,
ERNEST GAMBLE,
BY Robert G. McMorrow,
ATTORNEY.

APPARATUS FOR THE FABRICATION OF DECORATIVE PROTECTIVE COVERINGS

BACKGROUND OF THE INVENTION

1. Field of the Invention

This invention relates to the manufacture of decorative products such as floor and wall coverings.

2. Statement of the Prior Art

It has been heretofore proposed to produce decorative, wear-resistant covering products of multilayer formation wherein a basic layer of felt is provided with a coating composed of a mixture of chiplike material of semirigid vinyl or like substances, and a clear plastic. The decorative effect of this combination is similar to an irregular mosaic pattern and is characterized by an illusion of depth. Such products, by way of example, are found illustrated in the following U.S. Pats.:

Yakubik, No. 2,936,814, May 17, 1960; Heinrichs, No. 2,987,102, June 6, 1961; Yakubik, No. 3,049,761, Aug. 21, 1962; Almy, et al., No. 3,056,224, Oct. 2, 1962; and Wacker No. 3,194,859, July 13, 1965.

The products described in the above patents, and other products generally similar thereto, have found general acceptance. Manufacturing difficulties have however been encountered, particularly in respect to the distribution of the chips in desired orientation on the underlayer. In some of the prior manufacturing techniques, the chips are deposited in random fashion on a nonadhesive underlayer, and the layer and the chips are thereafter vibrated to distribute the chips. Still other previous manufacturing methods involve a tacky base layer in which chips are embedded by a pressure system. These procedures have proven quite costly and have resulted in many malfunctions of manufacture and other difficulties.

SUMMARY OF THE INVENTION

The present invention relates to a method of fabricating a decorative, wear-resistant floor or wall covering, or the like, and to apparatus employed in the practice of the method. In this invention, chips of decorative, vinyl material are preoriented in a selected pattern and thereafter deposited in said pattern on a moving web of prepared material. A basic objective of the invention resides therefore in the provision of apparatus employed in a system of chip distribution which places the chips on a moving underlayer of backing material in such fashion that no additional orientation or positioning of the chips is thereafter required. The within described process, in terms of the finished product resultant therefrom, produces an article in which approximately 5 percent to 20 percent of the chips abut or overlap one another to some extent.

Apparatus as herein proposed has the additional advantage of adaptability for use in other and different environments, wherein the distribution of a preoriented pattern of chip-form materials is required. In addition, this apparatus and the related method may be employed to advantage in the fabrication of different types of flooring patterns.

The invention in essence includes apparatus by means of which a moving web or continuous sheet of backing material has a hopper disposed thereover. The hopper receives a supply of chips of decorative material which are placed within the hopper by a gravitationally weight-responsive metering mechanism and are subjected to separation and general lateral distribution within the hopper, and thereafter discharged onto an inclined, vibrating plate. The vibration of the plate, in coaction with its other structural features, is effective to preorient the chips in a mosaiclike pattern wherein from 80 percent to 95 percent of the chips are mutually spaced from one another. The plate includes a distribution edge section arranged in proximity to the moving web, and the chips gravitate from the discharge edge section onto the web, retaining the aforesaid pattern and spacing. Following this, the chips and web are subjected to the imposition of heat and pressure to set their relative positions. Dry blend resinous material is metered over the web and inset chips and the components are again subjected to the imposition of heat and pressure instituting a thermal reaction which causes the dry blend to harden into an overlayer or grout with the chips embedded therein.

Additional advantages and objectives of this invention will become apparent to those skilled in the art from a consideration of the following specification when read in conjunction with the annexed drawings.

BRIEF DESCRIPTION OF THE DRAWINGS

FIG. 1 is a schematic view of a manufacturing layout for practice of this invention, including the new and novel apparatus hereof;

FIG. 2 is a medial cross-sectional view on enlarged scale, showing the hopper chute and chip orientation plate means, taken substantially on the line 2-2 of FIG. 1, looking in the direction of the arrows;

FIG. 3 is a perspective view of a portion of the plate and chute;

FIG. 4 is a plan view illustrating a section of protective and decorative coating constructed in accordance with the teachings of this invention;

FIG. 5 is a sectional view substantially on the line 5-5 of FIG. 4; and

FIG. 6 is a fragmentary perspective view showing the gravitational feed mechanism for the hopper hereof.

DESCRIPTION OF THE PREFERRED EMBODIMENT

A typical product as produced under the method of this invention and employing its apparatus is shown in FIGS. 4 and 5. This product, identified in the drawings by reference numeral 10, is included for illustration of a nonlimiting example of the type of product which results from the method hereof, and will be seen to comprise the usual backing or underlayer 12 formed conventionally of inorganic (asbestos) felt material or similar stock and coated with a layer of an acrylic binder 14. The acrylic latex binder 14 forms a barrier to prevent the migration of plasticizer into the backing, and to prevent foreign matter from the felt from entering the decorative layer thereabove. In addition, this layer permits the presetting of the chips during manufacture, as appears in more detail below. The chips 16 forming a part of the product 10 are of vinyl stock of a desired pigmentation and size—usually being opaque, and each includes an upper surface 18 and a lower surface 20. The chip lower surfaces 20 in most instances directly contact the acrylic layer 14 over the felt base 12, and the upper surfaces 18 are exposed, forming a part of the upper exposed surface of the completed floor or wall covering. In some cases, the chips 16 are disposed in partially overlapping relation, in which case the lower surfaces are inclined as indicated at 22.

The chips are supplied with a hardened grout 24 of clear resin. In the finished product, the grout occupies the spaces between the chips and has top surfaces 26 which are coplanar with the surfaces 18 of the chips, said surfaces collectively forming the wearing surface of the completed product.

Manufacture of the product involves a sequence of operations best disclosed with reference to FIGS. 1 and 6 of the drawings. In the former schematic presentation, it will be observed that pretreated felt backing 12 is dispensed from a supply roll 28 and is fed web-form over a conveying roller 30. As the backing assumes the characteristics of a web 32, having passed over an initial roller 30, it is coated with an acrylic substance, such as the latex binder paint discussed above, fed from a supply tank 34. The web is thereafter dried by a radiant energy heat source 32 which hardens the latex into the barrier layer 14. The web 32, as it approaches the location at which the chips are deposited thereon, is thus provided with a smooth, impervious top surface which is not tacky and which is conducive to the deposit of vinyl chips thereon in an even manner.

In FIG. 6 of the drawings, the feed mechanism 100 hereof is illustrated. The mechanism 100 is positioned adjacent the entry bin 38 of the hopper 40 hereof, and includes a plurality of conveying belts 102 each provided with a suitable drive 104. The belts are positioned in an across-machine direction relation to the web. Each of the drives 104 is connected to a weighing mechanism 106. Chips 16 are fed from a supply thereof by a screw conveyor 108 in a housing 110, and it will be noted that linkage means 112 connects the weighing members 106 and the conveying screw drives 114. Thus, the speed (and therefore the flow rate) of the chips is made a function of their weight. Any desired rate can be established by changes in the settings of the weight mechanisms. This gravitationally responsive feed of the chips, where the weight of the chips may be held as a constant factor in respect to their volume, further insures uniformity of positioning. In addition, material variations are compensated for inasmuch as the bulk density of the chips deposited is directly related to the dimension of the individual chips.

The chips 16 are supplied by any suitable means into the entry bin 38 of the hopper 40. The bin has a throat section 42 with converging walls terminating at a lower end 44. At the end 44, the hopper includes a chute assembly 46. The chute 46 (FIG. 2) is of elongated, substantially rectangular form and includes sidewalls 48,50 and end walls 52,54. The respective walls define a slotlike enclosure having an entrance adjacent the lower end 44 of the throat section. Disposed across the entrance between the walls 48 and 50 is a series of vanes 56 arranged in a row in mutually equidistantly spaced relation. A plurality of rows of staggered pins or rods 58 extend between the walls 48 and 50 below the vanes.

Chips 16 are fed into the bin 48 and gravitate through the throat section 42. Upon encountering the vanes 56 at the entrance of the chute 46, the chips are dispersed longitudinally to obtain a substantially even or uniform lateral distribution. The pins or rods 58 improve this distribution as the chips pass through the chute, and additionally control the velocity of gravitation of the chips therethrough.

The chute terminates at a discharge end opening 60 located over inclined plate means 62. The plate means 62 comprise a highly polished chromium tray 64 having an elevated rear end 66 and a front end 68. The plate has a top surface 70 and has side retaining flanges 72,74. At a plurality of spaced locations (two in the illustrated example), the plate has steps 76. Each is upwardly inclined from the general line of descent of the plate and thereby creates a dam 77 which temporarily slows the descent of the chips on the plate, and thereafter accelerates their movement by virtue of a downwardly declined section thereof. The smooth surface 70 of the plate, and its steps 76, tend to separate the chips and to orient them in a random, mosaiclike pattern. Each chip has its major flatwise extent disposed parallel to the surface of the plate in said pattern. To aid in this orientation and to control the patterning of the chips, mechanical vibrators 78 of any suitable type are provided. The vibrators are housed in casings 80 which are fixedly secured to the underside of the plate. The vibrators are the type such that they impart a front to rear movement to the plate (in respect to the ends 66 and 68). The pattern achieved is a function of the front to rear limitation of movement of the vibrator, inasmuch as other types of vibration tend to result in swirling patterns. This front to rear vibratory movement also avoids eddy currents in the chip pattern which are found to result from other and different vibratory motions.

As the chips 16 gravitate down the plate, they leave the discharge end 68 and are transferred to the web 32 in the aforesaid pattern.

With the chips thus loosely resting in said pattern on the web 32, the web proceeds in its movement by the action of additional roller means or the like. The web then passes between heated pressing rollers 84,86 (roller 84 being supplied with a cleaning roller 88), which softens the layer 14 and presses the chips 16 thereinto.

A distributor 82 for a powdered dry blend of thermal responsive resin overlies the web downstream of the chip deposit location and downstream of the heated pressing rollers 84,86. The resin is there imposed on the web and chips and occupies the spaces between the chips. Thereafter, the web passes into a thermal treatment chamber 90. In this chamber, the entire web is subjected to heat to a degree such that a thermal reaction of the resin occurs which causes a plasticizing and binding of the resin into a clear overlayer on the web which surrounds the chips and fills the spaces therebetween.

Following this heat treatment, the web, now comprising a substantially completed covering, is passed about cooling rollers 92, and is thereafter wound in a roll supply 94 on a takeup reel 96.

The foregoing will be recognized as offered by way of example only and not by way of limitation.

We claim:

1. A machine for depositing chips of wear resistant material in a randomly oriented array upon a movable web while the web is in motion, comprising:

a hopper mounted above the movable web and supplied with chips from a supply source;

an elongated chute adapted to receive chips from the hopper, said chute containing a row of spaced guide vanes and a plurality of rows of staggered guide pins adapted to regulate the flow velocity and lateral distribution of chips passing therethrough;

a downwardly inclined plate having an upper end disposed to receive chips falling from the chute and a lower end positioned to discharge chips in oriented array upon the moving web;

means to impart vibratory motion to the plate in a front-to-rear direction with respect to the upper and lower ends of the plate to cause the chips to slide down the plate; and a dam extending crosswise of the plate and shaped to slow the movement of chips approaching the crest of the dam and to speed the movement of chips leaving said crest whereby chips sliding down the plate are oriented in a random mosaiclike array at the time they are discharged from the plate upon said moving web.

2. A machine as described in claim 1 wherein there are at least two of the said crosswise dams spaced from each other along the sloping axis of the plate, so that chips sliding down the plate pass over each of said dams in succession, whereby chips leaving the crest of the upper dam are separated from each other and chips approaching the crest of the lower dam are brought closer to each other in order thus to orient said chips in a random manner as they slide down the plate.

3. Apparatus as described in claim 1 in which the means imparting vibratory motion to the inclined plate are mechanical vibrators secured to the underside thereof.

4. Apparatus in a system of manufacture of a decorative, wear resistant product, the system including a movable web of backing material and chips of wear resistant material embedded in a coating of clear plastic, the apparatus serving as the means of deposit of the chips on the movable web while the web is in motion, comprising:

a hopper mounted in a location above the movable web and spaced therefrom;

the hopper having an inlet portion supplied with said chips in a flow pattern from a supply source, and including a discharge outlet;

means disposed within the hopper in the flow path of the chips to regulate the flow velocity and lateral distribution of the chips;

inclined plate means disposed adjacent the discharge outlet of the hopper to receive the chips serially upon discharge from the hopper;

means imparting a vibratory motion to the inclined plate means;

the means imparting a vibratory motion to the plate means imparting said motion in a front-to-rear direction only;

the hopper including a chute having an initial row of transverse vanes; and additional rows of rods disposed in staggered relation to one another.